United States Patent [19]

Rausch, Sr. et al.

[11] Patent Number: 5,605,246

[45] Date of Patent: Feb. 25, 1997

[54] REUSABLE ERGONOMIC SHIPPING AND HANDLING CONTAINER

[75] Inventors: William E. Rausch, Sr., Warren; Raymond A. Zagger, Brookfield, both of Ohio

[73] Assignee: General Motors Corporation, Detroit, Mich.

[21] Appl. No.: 599,685

[22] Filed: Feb. 18, 1996

[51] Int. Cl.⁶ .................................................. B65D 7/00
[52] U.S. Cl. ........................... 220/555; 220/345; 206/454; 206/564
[58] Field of Search ..................................... 220/345, 583, 220/555; 206/391, 454, 445, 455, 456, 561, 564

[56] References Cited

U.S. PATENT DOCUMENTS

| | | |
|---|---|---|
| 3,477,105 | 11/1969 | Farren .................................. 206/391 |
| 3,708,061 | 1/1973 | Weingarden et al. ................. 206/391 |
| 3,887,071 | 8/1975 | Thomaswick ......................... 206/454 |
| 4,023,691 | 5/1977 | Perel .................................... 206/454 |
| 4,090,632 | 5/1978 | Katzmann et al. ................... 220/4.26 |
| 4,424,902 | 1/1984 | Silinsky et al. ...................... 206/454 |
| 5,076,454 | 12/1991 | Garton et al. ........................ 220/4.26 |
| 5,259,523 | 11/1993 | Scherb ................................. 206/454 |
| 5,280,132 | 1/1994 | Clarey et al. ........................ 220/4.03 |
| 5,285,895 | 2/1994 | Bolt ...................................... 206/454 |

*Primary Examiner*—Joseph M. Moy
*Attorney, Agent, or Firm*—Lawrence B. Plant

[57] ABSTRACT

An ergonomic shipping and handling container having a compartment accessible through an opening in the side thereof which is closed off by a gate slidable in channels formed in opposing sidewalls of the compartment. The gate includes means for preventing the sidewalls from spreading apart during shipping and for hanging the gate along side thereof when not in use.

6 Claims, 3 Drawing Sheets

REUSABLE ERGONOMIC SHIPPING AND HANDLING CONTAINER

This invention relates to a reusable shipping and handling container for heavy flat objects, which container is ergonomically designed to minimize strain on the person unloading the container.

BACKGROUND OF THE INVENTION

Terminals for electrical wiring are punched from ribbons of metal, and the ribbons, with terminals punched therein, are wound onto reels and shipped to customers. The customers mount the reels onto appropriate machinery which clips the terminals from the ribbons and attached them to appropriate wiring. Such reels typically can vary from about a half inch to about two inches thick and about eight pounds to about 45 pounds per reel. Heretofore, such reels have been shipped in open-top containers which have required the person unloading the reels to bend over the edge of the container to lift the reels out. Such motion can cause back strain or worse.

The present invention contemplates a reusable container that can be placed on a table or support at approximately waist height (i.e., of the unloader), and that permits access to the inside of the container via the side thereof so that little or no bending is required to lift the reel out of the container. The container will be sufficiently rigid and durable as to be able to contain the reels during the often severe jostling that occurs during the shipping and handling of the containers.

SUMMARY OF THE INVENTION

The present invention is a reusable, ergonomic shipping and handling container for heavy, flat items (e.g., reels of metal ribbon) stacked in a compartment of the container. More specifically, the container comprises a floor, a pair of opposing sidewalls, a fixed endwall joining the sidewalls and a removable endwall opposite the fixed endwall. The removable endwall takes the form of a gate that slides in channels formed in the ends of the sidewalls and, when removed, leaves an opening through which the items are removed. The removable endwall or gate, provides lateral access to the compartment for removal of the items therein through the end thereof, while preventing access to the compartment therethrough during shipping. The gate comprises a central panel having a top rim, a bottom rim, first and second opposing lateral rims and an elongated tongue extending from each of the panel's lateral rims into the channels in the sidewalls (i.e., when the gate is in place). The bottom rim of the panel includes a retainer which engages the bottom of the opening in which the gate fits to resist accidental disengagement of the gate from the opening as perhaps might occur should the container be dropped. The retainer will preferably comprise a tongue extending at least partially along the bottom rim of the panel for snugly engaging a channel formed in the floor of the container. A pair of flanges project from opposite ends of the top rim outboard the panel so as to overlie the ends of the sidewalls adjacent the gate. Interlocks associated with the flanges engage the opposing sidewalls at their ends and prevent the sidewalls from spreading apart during shipment.

In accordance with a preferred embodiment of the invention, the container will comprise two separate compartments separated one from the other by a partition, and have a separate gate for each compartment. More preferably, a mortise is formed at the ends of the upper borders of each of the opposing sidewalls, and the outwardly projecting flanges on the gate are tennons which mate with the mortises and overlie the ends of the sidewalls. Most preferably, each flange/tennon includes an ear projecting from the tennon toward the partition and mating with the mortise. A deck at the bottom of each mortise includes a socket for securely receiving a dowel depending from the underside of each of the ears which serves to keep the ends of the sidewalls from spreading apart during shipment while the gate is in place. Most preferably, a pair of recesses are provided in the upper border of at least one of the sidewalls for receiving the dowels on the undersides of the ears for hanging/storing the gate along side the container when it is removed from the end of the container.

DETAILED DESCRIPTION

The invention will be better understood when considered in the light of the following detailed description of a specific embodiment thereof which is given hereafter in conjunction with the several figures in which.

Figure 1:
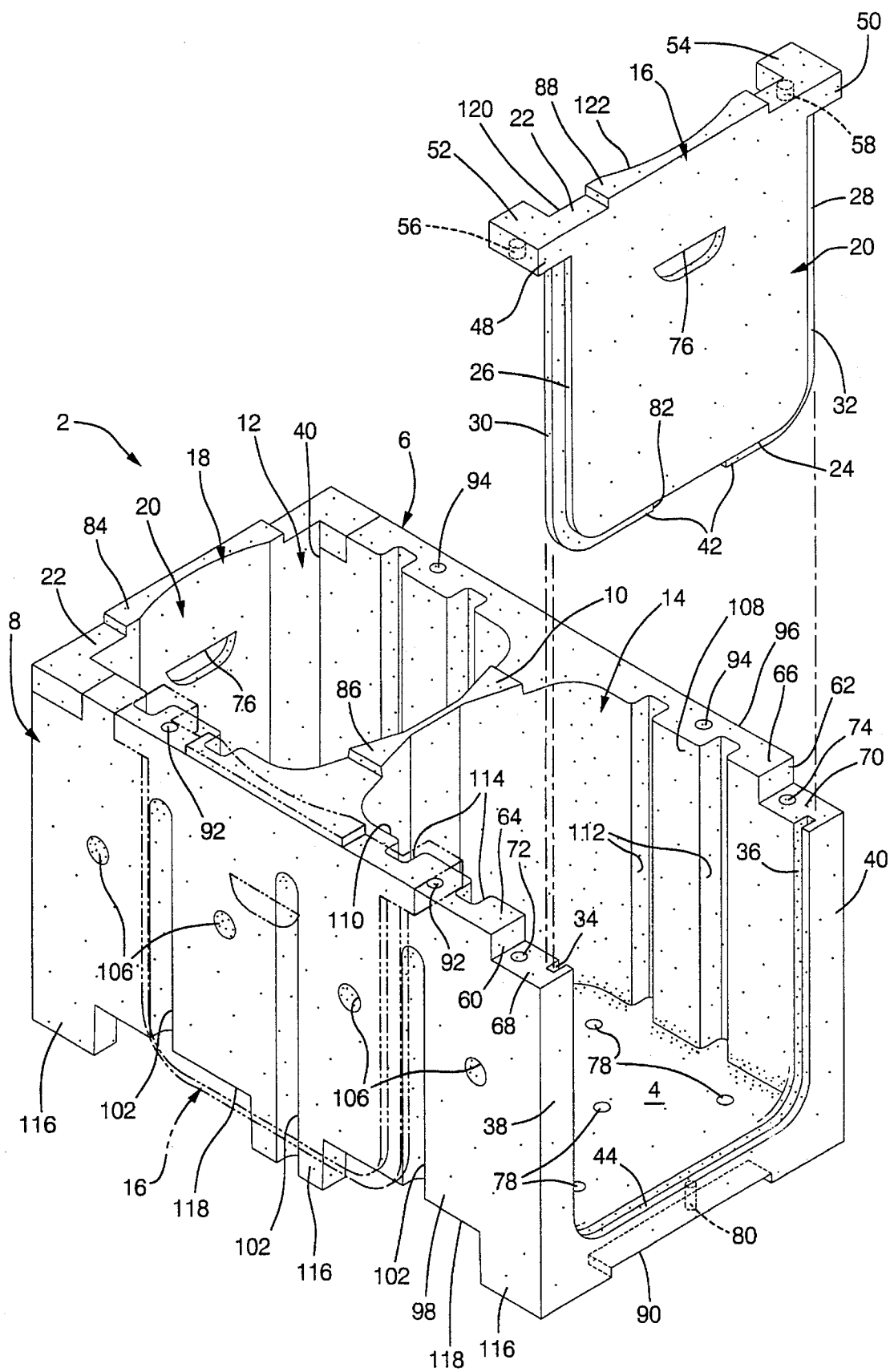
FIG. 1 is a perspective view of a preferred container in accordance with the present invention.
Figure 2:
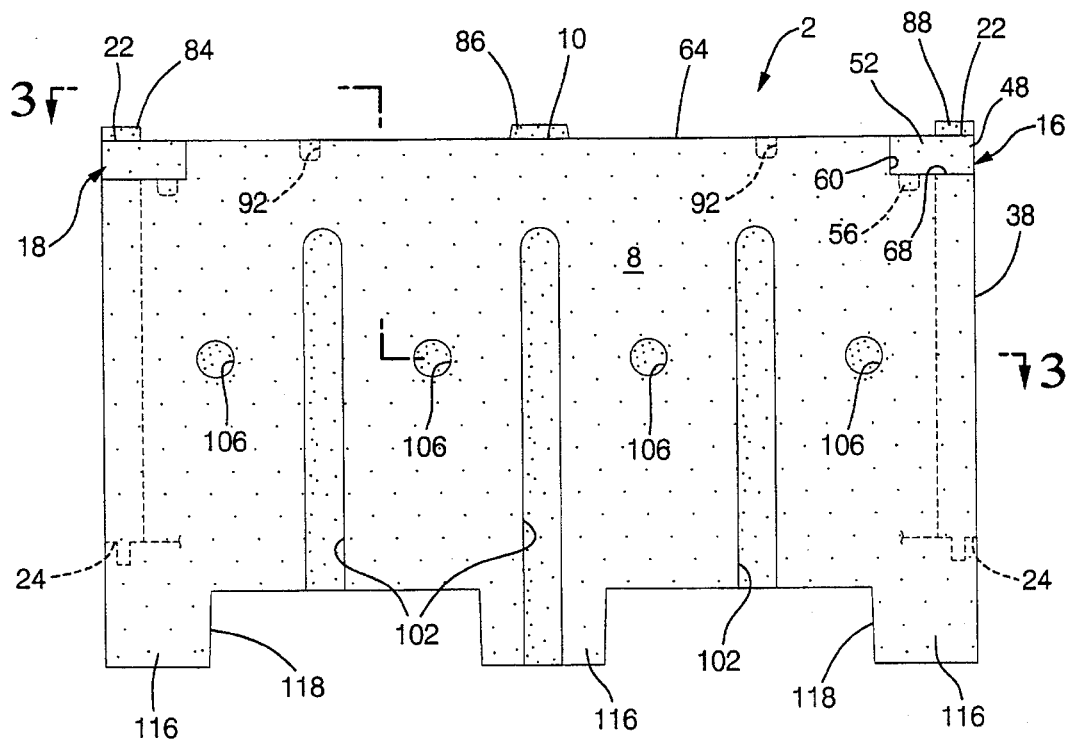
FIG. 2 is a side elevational view in the direction 2—2 of FIG. 1.

The Figures show a reusable container 2 comprising a floor 4, and opposing sidewalls 6 and 8 joined together at their center by partition 10 so as to provide two compartments 12 and 14 for receiving and discharging a plurality of flat items such as reels of wire ribbon (not shown). Endwalls 16 and 18 take the form of slidable gates which are removable to provide lateral access to the compartments. The removable endwalls or gate 16, 18 each comprises a center panel 20 having a top rim 22, bottom rim 24 and lateral rims 26 and 28. Elongated tongues 30 and 32 project outwardly from the lateral rims 26 and 28 of the panel 20 of end wall or gate 16 and slidably engage channels 34 and 36 formed in the ends 38 and 40 of the sidewalls 8 and 6 respectively. Another tongue 42 extends along the bottom rim 24 and engages a channel 44 formed in the floor 4. The tongue 42 fits snugly within the channel 44 to prevent accidental dislodging of the gate 16 from the opening 46 filled by the gate 16. The gate 18 and associated sidewalls are similarly structured and function in the same manner as described for gate 16.

A pair of flanges 48 and 50, in the form of tennons, extend from opposite ends of the top rim 22 so as to overlie the ends 38 and 40 and slots 34 and 36 therein. A pair of ears 52 and 54 project from the flanges 48 and 50 respectively in the direction of the partition 10 and include dowels 56 and 58 depending therefrom. A pair of mortises 60 and 62 are formed in the ends 38 and 40 of the upper borders 64 and 66 of the sidewalls 8 and 6, respectively. Each mortise is defined by a deck 68 and 70 at the bottom thereof which, in turn, include sockets 72 and 74 therein for receiving the dowels 56 and 58 depending from the ears 52 and 54 which mate with the mortises 60 and 62, respectively. With the dowels 56 and 58 positioned in the sockets 72 and 74, the sidewalls 6 and 8 are prevented from spreading apart during shipment. A handle grip 76 is formed through the face of the panel 20 for grabbing and lifting the gates out of the channels 34 and 36.

Drain holes 78 are provided in the floor 4 to allow any liquid that might enter the container 2 to drain therefrom. Optionally, a drain hole 80 may also be provided in the bottom of the channel 44. The bottom tongue 42 of the gate 16 has a cutout portion 82 overlying the drain hole 80 (when used) which allows any fluid on the floor 4 to pass therethrough and into the drain 80.

Upstanding ridges 84, 86 and 88 atop the container walls nest in complementarily-shaped cavities (only 90 shown) formed in the underside of the container 2 to lock the containers together when several containers are stacked one atop the other, and thereby prevent shifting of the stacked containers one with respect to the other. The upper borders 64 and 66 of the sidewalls 8 and 6 each contain a pair of recesses 92 and 94, respectively, for receiving the dowels 56 and 58 depending from the ears 52 and 54 for hanging/ storing the gate 16 along side the container 2 as shown in phantom in FIG. 1.

Figure 3:
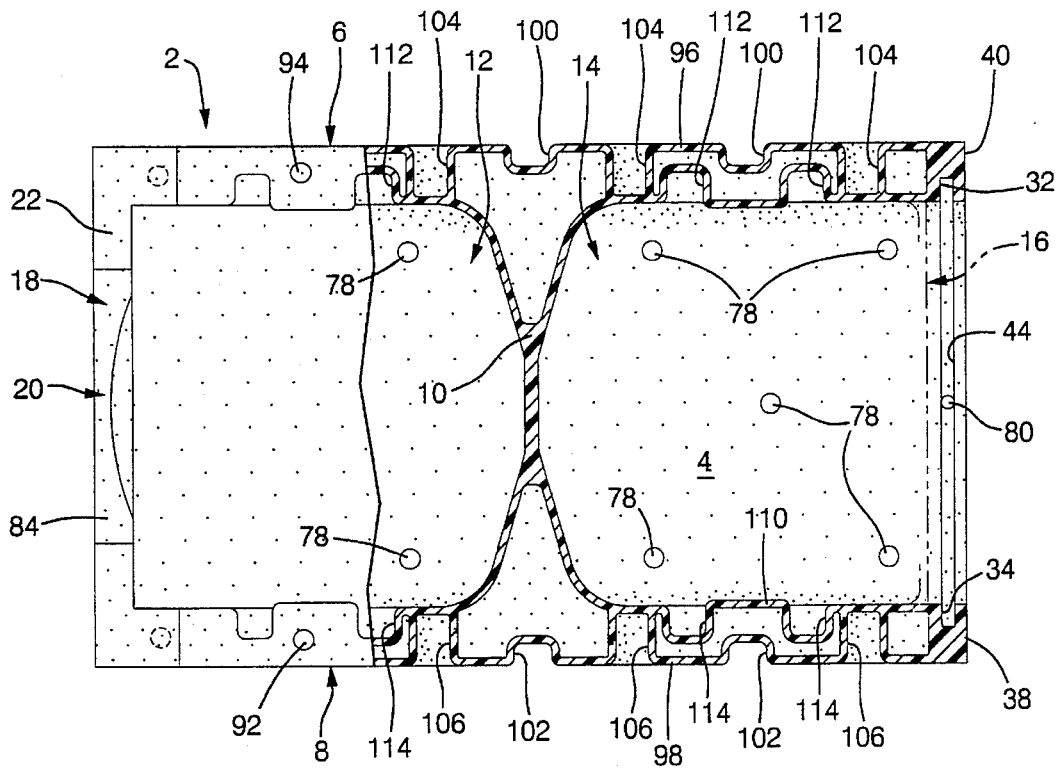
FIG. 3 is a partially sectioned plan view in the direction 3—3 of FIG. 2.
Figure 4:
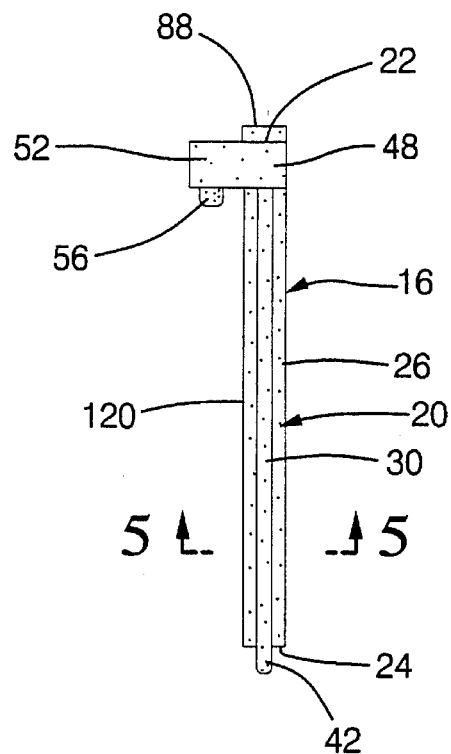
FIG. 4 is a side view of the gate in accordance with the present invention.
Figure 5:
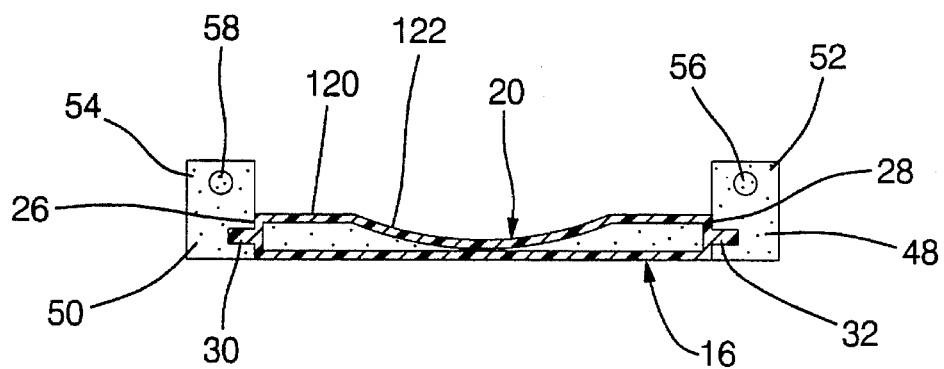
FIG. 5 is a view in the direction 5—5 of FIG. 4.

As best shown in FIG. 3 the container 2 has a double-wall construction, and is preferably formed by rotational molding of a suitable high strength polymer such as high density polyethylene. The outside walls 96 and 98 of the sidewalls 6 and 8 respectively, include reinforcing ribs 100 and 102. Tubes 104 join the outer wall 96 to the inner wall 108 while the tubes 106 serve to join the outer wall 98 to the inner wall 110 to further strengthen the walls. Inner walls 108 and 110 also include reinforcing ribs 112 and 114, respectively. Like the sidewalls 6 and 8, the gate 16 will have a dual wall structure with the inside wall 120 having an arcuate section 122 having a radius conforming substantially to the radius of the reels being stacked in the container.

The container 2 stands on legs 116 which lift the container high enough to permit the forks of a forklift truck to enter the space 118 for moving the container 2.

While the invention has been described primarily in terms of a specific embodiment thereof it is not intended to be limited thereto, but rather only to the extent set forth hereafter in the claims which follow.

What is claimed is:

1. A reusable, ergonomic shipping and handling container for receiving and discharging a plurality of substantially flat items from a stack thereof contained in a compartment of the container, said container comprising a floor, a pair of opposing sidewalls upstanding from said floor, a fixed endwall upstanding form said floor and joining first ends of said sidewalls together, a pair of opposing channels in second ends of said sidewalls opposite said first ends, an opening in said container and between said channels for providing lateral access to said compartment for removal of said items through the end of said container during said discharging, a removable gate filling said opening for preventing access to said compartment through said opening during said shipping, said gate comprising a central panel having a top rim, a bottom rim, first and second opposing lateral rims, and a tongue extending from each of said lateral rims into said channels when said gate is positioned in said opening, a retainer disposed on said bottom rim and engaging the bottom of said opening for preventing said panel from unintentionally becoming disengaged from said opening, a pair of flanges extending from opposite ends of said top rim of said gate so as to overlie said second ends of said sidewalls and a pair of interlocks associated with said flanges for engaging said opposing sidewalls at said second ends to prevent said second ends from spreading apart during shipment.

2. A container according to claim 1 wherein said retainer engages said floor.

3. A container according to claim 2 wherein said retainer comprises a tongue engaging a groove in said floor.

4. A reusable, ergonomic shipping and handling container for receiving and discharging a plurality of substantially flat items from a stack thereof contained in a compartment of said container, said container comprising a floor and a pair of opposing sidewalls upstanding from said floor and together therewith defining a pair of compartments, a partition joining said opposing sidewalls intermediate the length of said opposing sidewalls and separating said compartments from each other, said opposing sidewalls terminating in first and second sets of opposing ends, a pair of opposing channels in each set of said opposing ends, each said pair of channels defining an opening opposite said partition for providing lateral access to its adjacent compartment for removal of said items through the ends of said container during said discharging, a slidably removable gate filling each of said openings for preventing access to its associated compartment through said opening during said shipping, said gate comprising a central panel having a top rim, a bottom rim, first and second lateral rims and a tongue extending from each of said lateral rims into said grooves when said gate is positioned in said opening.

5. A reusable, ergonomic shipping and handling container for receiving and discharging a plurality of substantially flat items from a stack thereof contained in a compartment of said container, said container comprising a floor and a pair of opposing sidewalls upstanding from said floor and together therewith defining a pair of compartments, a partition joining said opposing sidewalls intermediate the length of said opposing sidewalls and separating said compartments from each other, said opposing sidewalls each having an upper border and terminating in first and second sets of opposing ends, a mortise in each said border at said ends, a deck at the bottom of each said mortise, a pair of opposing channels in each set of said opposing ends, each said pair of channels defining an opening opposite said partition for providing lateral access to its adjacent compartment for removal of said items through the ends of said container during said discharging, a slidably removable gate filling each of said openings for preventing access to its associated compartment through said opening during said shipping, said gate comprising a central panel having a top rim, a bottom rim, first and second lateral rims and a tongue extending from each of said lateral rims into said channels when said gate is positioned in said opening, a pair of tennons extending from said top border outboard said panel for mating with said mortises and overlying said channels, a pair of ears projecting from said tennons toward said partition and mating with said mortise, a dowel depending from the underside of each of said ears, and a socket in each said deck engaging a said dowel to keep the ends of each said set from spreading apart during shipment.

6. A container according to claim 5 wherein at least one of said borders includes a pair of recesses adapted to receive said dowels for storing said gate along side a said sidewall while a said compartment is being unloaded through a said opening.

\* \* \* \* \*